Patented Oct. 3, 1939

2,175,103

UNITED STATES PATENT OFFICE 2,175,103

MANUFACTURE OF CELLULOSE ESTERS

Ernst Berl, Pittsburgh, Pa.

No Drawing. Application January 25, 1937, Serial No. 122,319. In Great Britain January 29, 1936

9 Claims. (Cl. 260—225)

This invention relates to the manufacture of partially esterified cellulose esters and has particular reference to the degradation or partial de-esterification of fully esterified esters manufactured in the known manner from cellulose while retaining the fibrous condition during such manufacture.

When cotton linters or similar cellulosic material are treated for conversion into a cellulose ester by means of a lower fatty acid such as acetic and/or propionic acid in the presence of a catalyst such as sulphuric, chlorsulphonic, benzene-sulphonic or perchloric acid or the like—and eventually with the appropriate acid anhydride—while retaining the fibrous state as by means of a suitable diluent, the ester produced contains a certain amount of the catalyst either combined or strongly absorbed.

The presence in fully esterified cellulose esters of the aforesaid amounts of remaining catalyst has an undesirable effect on any subsequent hydrolysis or partial de-esterification, and in particular the speed of such hydrolysis varies with the amount of the remaining catalyst present. In general the production of a uniform product is very difficult, and in many cases the speed of the hydrolysis becomes too great and results in a product which is of low viscosity and under certain conditions is no longer soluble in acetone.

According to the present invention a partially esterified cellulose ester of good quality is obtained from a fully esterified cellulose ester resulting from reacting cellulosic material with a fatty acid and an acid catalyst—and eventually with the appropriate anhydride—while retaining the fibrous state, by dissolving the fully esterified ester by heating it with a concentrated lower fatty acid in the presence of a salt of a weak acid capable of reacting with the residual acid catalyst.

Suitable hydrolyzing acids are for example formic acid, acetic acid or propionic acid. Such acids may be used in a strong or anhydrous state or they may contain some water and they may be used singly or in admixture with one another or with other substances of a weakly acidic character, such for example as phenols. The degree of aqueous condition of these acids may vary according to the time period desired for effecting the hydrolysis. The temperature employed for the hydrolysis may be a high temperature or an only moderately raised temperature as compared with ordinary acetylating temperature and preferably in the case of acetic acid a temperature of from about 80° C. to 120° C. which is lowered eventually to stop the reaction. The acids act as solvents but if desired other solvents may be added that do not of themselves hydrolyze the fully esterified cellulose.

Suitable salts for use with the hydrolyzing acids are for example, sodium formate, sodium acetate and/or borax, soaps, phenolates and the like; besides alkali salts or alkaline earth salts, the salts of heavy metals may be used if they are salts of weak organic and/or inorganic acids possessing a sufficient degree of solubility in the acids that are employed for the main hydrolyzing process of the present invention.

The function of the salts used in conjunction with the hydrolyzing acids is to react with the acid catalyst remaining in the fully esterified ester and combine with it and in consequence liberate the weak organic or inorganic acid radicle of the salt.

The following are three examples of carrying the invention into effect:

Example 1

Cellulose triacetate in fibre form which has been produced for example, in accordance with British Patent No. 381,991 is freed from the esterifying bath which consists of acetic anhydride, acetic acid, sulphuric acid and benzene, by means of a non-solvent for the triacetate, for example benzene. The triacetate containing benzene is then introduced into a hydrolyzing bath consisting of acetic acid (approximately 95%) containing 0.1 to 2% of its weight of sodium acetate. The ratio between the amount of triacetate being treated and the amount of acetic acid in the hydrolyzing bath may lie between 1 to 3 and 1 to 15. The triacetate dissolves and the viscous solution is maintained at a temperature between 80 and 120° C. Benzene which distils over and which contains small amounts of water and acetic acid is recovered. In accordance with the degree of hydrolyzing effect desired the heating is continued for a longer or shorter time at the requisite temperature. After several hours the ester becomes soluble in acetone. The process can be readily regulated because the time required is between 6 and 72 hours depending on the temperature and the concentration of the acetic acid employed. By employing anhydrous acetic acid the process proceeds very slowly. Conversely, when employing too dilute an acetic acid, such acid is no longer a solvent for the tri-acetate. Therefore, there exists a definite optimum concentration which lies at approximately 90 to 98 per cent acetic acid content.

When the acetate becomes soluble in acetone and the desired content of combined acetic acid has been attained the hydrolyzing process may be interrupted by lowering the temperature to room temperature or lower, or alternatively the hydrolyzing may be brought to an end by pouring the whole solution into water or ether or other liquids which dissolve acetic acid and which are non-solvents for the acetone soluble acetate whereupon the latter can easily be isolated. Acetic acid can be recovered readily from the resulting solutions and brought to the required strength for the next hydrolysis process. The acetone soluble material obtained, which, with advantage, is precipitated in the form of thin foils or as a fine powder is freed from acetic acid. When necessary it can be stabilized, for example, in accordance with the process of British Patent No. 402,692. It can also be stabilized completely by heating with alcohols, with advantage di- or tri-valent alcohols, such as for example, glycol and/or glycerine.

An acetone soluble material is thus obtained which is truly soluble in acetone, that is, it can be redissolved repeatedly in acetone, after the solid state has been reached by the evaporation of the solvent. The process enables cellulose acetate with any desired content of acetic acid to be produced with ease. Products can be readily produced which are acetone soluble and have an acetic acid content of 57 or 58%, or acetates can be produced possessing the same solubility but containing 51 or 52% combined acetic acid, or acetates may be produced possessing acetic acid contents which lie between the above limits. The products are very valuable materials in the manufacture of artificial silks, films, and foils and because of the varying amounts of combined acetic acid the dyeing properties of the products vary.

*Example 2*

Instead of acetic acid, formic acid (85 to 95%) is employed in the hydrolyzing bath and sodium acetate or sodium formate is added. The solubility of cellulose triacetate is somewhat greater in strong formic acid in comparison with the dispersion capacity of acetic acid of the same strength. Formic acid is a stronger acid than acetic acid. Hence lower temperatures may be employed or the time of the hydrolytic process may be reduced in order to obtain an acetone soluble acetate with the same content of combined acetic acid.

*Example 3*

Cellulose tripropionate in the fibrous state is dissolved in a hydrolyzing bath of strong propionic acid containing a definite quantity of sodium propionate. Tetrachlorethane is added and the mixture heated at an elevated temperature with advantage not exceeding 120° C. until the desired solubility has been attained.

*Example 4*

Acetic acid is added to a solution of cellulose triacetate in a mixture of glacial acetic acid and acetic anhydride containing larger amounts of sulphuric acid or benzene sulphonic acid, chlorsulphonic or perchloric sulphonic acid which have served as catalysts. The acetic acid added contains sodium acetate in a quantity somewhat greater than that necessary to combine with the strong acids present. The acetic anhydride is saponified. The total strength of the acetic acid after the addition of the weaker acid should lie between 94 and 96%. This solution is heated to 95° C. for 15 to 40 hours. When tests show that the material is completely soluble in acetone the whole of the cooled mass is poured into an excess of ethyl ether. The acetone soluble acetate is precipitated in a highly swollen state. Ether may be eliminated from the acetate by the addition of methyl alcohol or ethyl alcohol and subsequently, if desired or required, by the addition of water. The acetone soluble acetate may be heated with ethyl alcohol or glycol for 1 to 2 hours at the boiling point of ethyl alcohol or when employing glycol at 90 to 100° C. The resulting acetate is completely soluble in acetone and possesses a high stability.

Through the addition of sodium acetate the strong acid catalyst will be neutralized. Therefore there is obtained an excellent high viscous little degraded acetone soluble cellulose acetate. If the strong acid were not neutralized then there would be obtained a very strongly degraded, practically valueless cellulose acetate.

Furthermore wood pulp may be pretreated with 80% to 100% formic acid in order to secure the clearest acetone soluble acetate solutions which may be obtained from wood cellulose. In this case the wood pulp is as stated above treated with 80% to 100% formic acid at normal temperature for from 4 to 24 hours. The formic acid enters with small amounts into the cellulose molecule. After this pre-treatment, one finds a few per cent (2–6%) of bound formic acid. The formic acid from the first bath can be eliminated by centrifuging or pressing out, and can be, if necessary, washed out with benzene. Then the pretreated material will be acetylated in the normal way by the above set forth process. Under these conditions the formic acid formerly bound will be split off nearly completely, so that after acetylation the material contains practically no bound formic acid. This material may be treated with about 90% formic acid under addition of sodium formate. The following table shows the results.

| Hours at 100° C. | Bound acetic acid | Bound formic acid | Solubility |
| --- | --- | --- | --- |
|  | Per cent | Per cent |  |
| 3½ | 55.2 | 3.7 | Completely in acetone. |
| 5½ | 54.35 | 4.75 | Do. |
| 6½ | 52.1 | 5.2 | Do. |
| 26 | 42.5 | 8.7 | Do. |
| 33 | 33.7 | 13.3 | Soluble only in acetone + water. |
| 48 | 25.6 | 17.7 | Insoluble in acetone + water. |

The great advantage of this treatment is that one can use for the first time wood pulp and make a very beautiful acetone-soluble acetate. If one pre-treats the wood pulp (having about 95–96% alpha cellulose content) with acetic acid and finishes with the retrosaponification with formic acid, one gets nice, nearly completely clear solutions in acetone. The clarity of this solution is increased if the pre-treatment and the retro-acetylation are carried out with formic acid. If instead of formic acid, acetic acid is used for both treatments, then those acetone solutions are somewhat cloudy.

The above method of retro-acetylation permits producing the tri-acetate with a minimum of acetic anhydride and to retro-acetylate with a rather slow process which permits making a very excellent acetone-soluble material.

Furthermore in spite of the rather high amount of bound formic acid, the acetone-soluble aceto formates are extremely stable. With the stabilization with sodium sulphate or by repeated treatment with glycol at about 100° C. an acetone-soluble aceto formate may be obtained with the highest stability of a fatty acid ester of cellulose.

I claim:

1. The method of producing a partially esterified cellulose ester comprising treating wood pulp with formic acid, then reacting the resulting product with a lower fatty acid with the aid of an acid catalyst and with the appropriate anhydride to form a tri-substituted cellulose ester, then dissolving the latter by heating it with a concentrated lower fatty acid in the presence of a salt of a weak acid capable of reacting with the residual acid catalyst.

2. The product secured by following the steps of claim 1.

3. The method of producing a partially esterified cellulose mixed ester of good quality from a tri-substituted cellulose acetate produced with acetic acid with the aid of an acid catalyst and with the appropriate anhydride which comprises dissolving the tri-substituted cellulose acetate in the fibrous state by heating it with concentrated formic acid in the presence of a salt of a weak acid capable of reacting with the residual acid catalyst until acetone solubility is reached.

4. The method of producing a partially esterified cellulose mixed ester of good quality from a tri-substituted cellulose acetate produced with acetic acid with the aid of an acid catalyst and with the appropriate anhydride which comprises dissolving the tri-substituted cellulose acetate in the fibrous state by heating it with an 85% to 95% concentrated formic acid in the presence of a salt of a weak acid capable of reacting with the residual acid catalyst until acetone solubility is reached.

5. The method of producing a partially esterified cellulose mixed ester of good quality from a tri-substituted cellulose acetate produced with acetic acid with the aid of an acid catalyst and with the appropriate anhydride which comprises dissolving the tri-substituted cellulose acetate in the fibrous state by heating it with concentrated formic acid in the presence of a salt taken from a group consisting of sodium formate, sodium acetate, borax, a soap and a phenolate until acetone solubility is reached.

6. The method of producing a partially esterified cellulose mixed ester of good quality from a tri-substituted cellulose acetate produced with acetic acid with the aid of an acid catalyst and with the appropriate anhydride which comprises dissolving the tri-substituted cellulose acetate in the fibrous state by heating it with concentrated formic acid in the presence of a salt of a weak acid capable of reacting with the residual acid catalyst, then terminating the hydrolysis when acetone solubility is reached and isolating the partially esterified acetone-soluble product by pouring the contents of the hydrolyzing bath into a liquid which will dissolve the free acid but is nonsolvent for the acetone soluble product.

7. The method of producing a partially esterified cellulose ester comprising treating wood pulp with formic acid at normal temperature for from 4 to 24 hours, then eliminating said formic acid from said wood pulp, then reacting the resulting product with a lower fatty acid with the aid of an acid catalyst and with the appropriate anhydride to form a tri-substituted cellulose ester, then dissolving the latter by heating it with a concentrated lower fatty acid in the presence of a salt of a weak acid capable of reacting with the residual acid catalyst.

8. The product secured by following the steps of claim 3.

9. The method of producing a partially esterified cellulose ester comprising treating wood pulp with formic acid, then reacting the resulting product with a lower fatty acid with the aid of an acid catalyst and with the appropriate anhydride to form a tri-substituted cellulose ester, then dissolving the latter by heating it with concentrated formic acid in the presence of a salt of a weak acid capable of reacting with the residual acid catalyst.

ERNST BERL.